Figure 1:
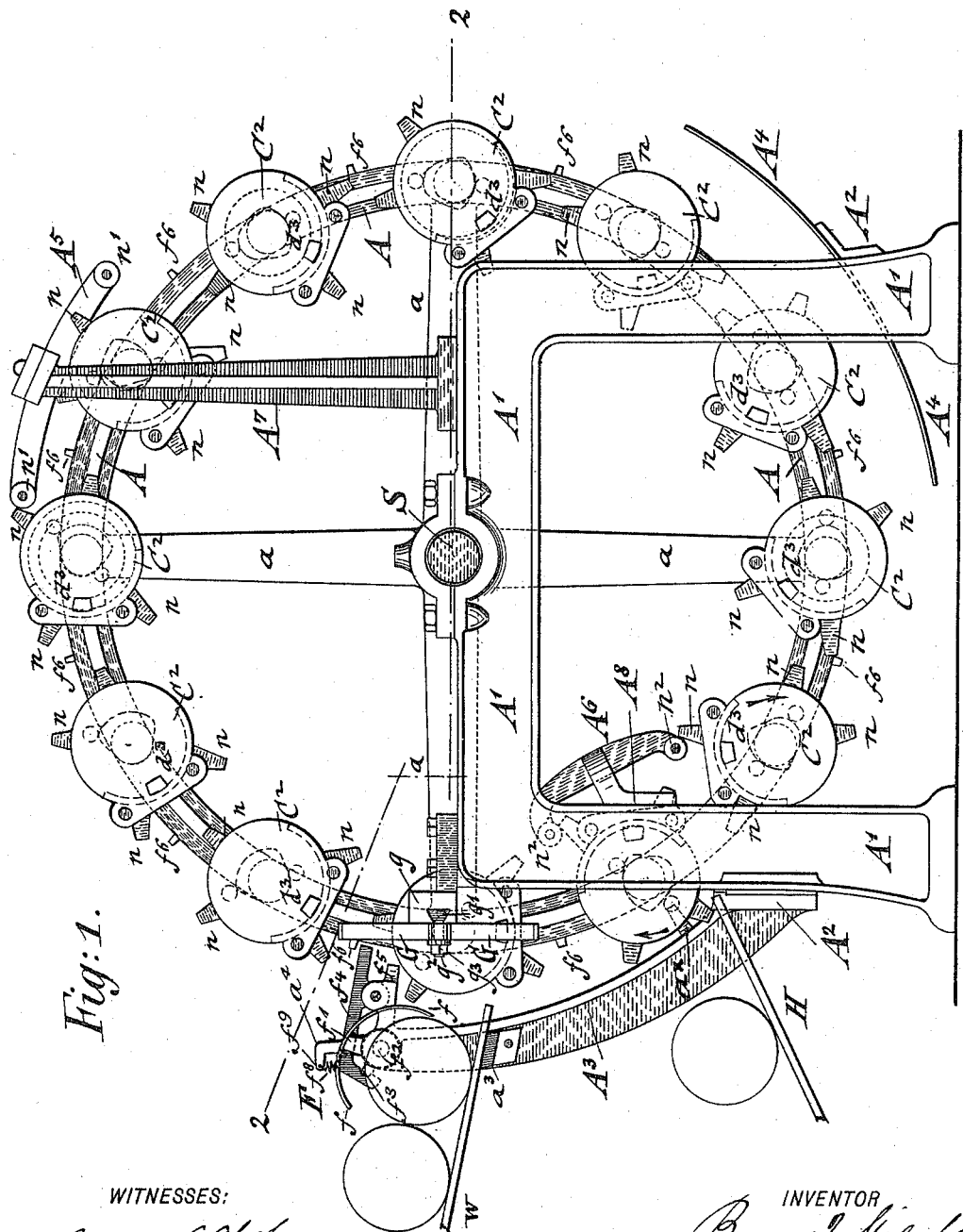

(No Model.) 4 Sheets—Sheet 1.

B. J. MALMFELT.
MACHINE FOR TESTING SHEET METAL CANS.

No. 586,072. Patented July 6, 1897.

WITNESSES:

INVENTOR

ATTORNEYS.

(No Model.) 4 Sheets—Sheet 2.

B. J. MALMFELT.
MACHINE FOR TESTING SHEET METAL CANS.

No. 586,072. Patented July 6, 1897.

WITNESSES:

INVENTOR

ATTORNEYS.

(No Model.) 4 Sheets—Sheet 3.
B. J. MALMFELT.
MACHINE FOR TESTING SHEET METAL CANS.
No. 586,072. Patented July 6, 1897.
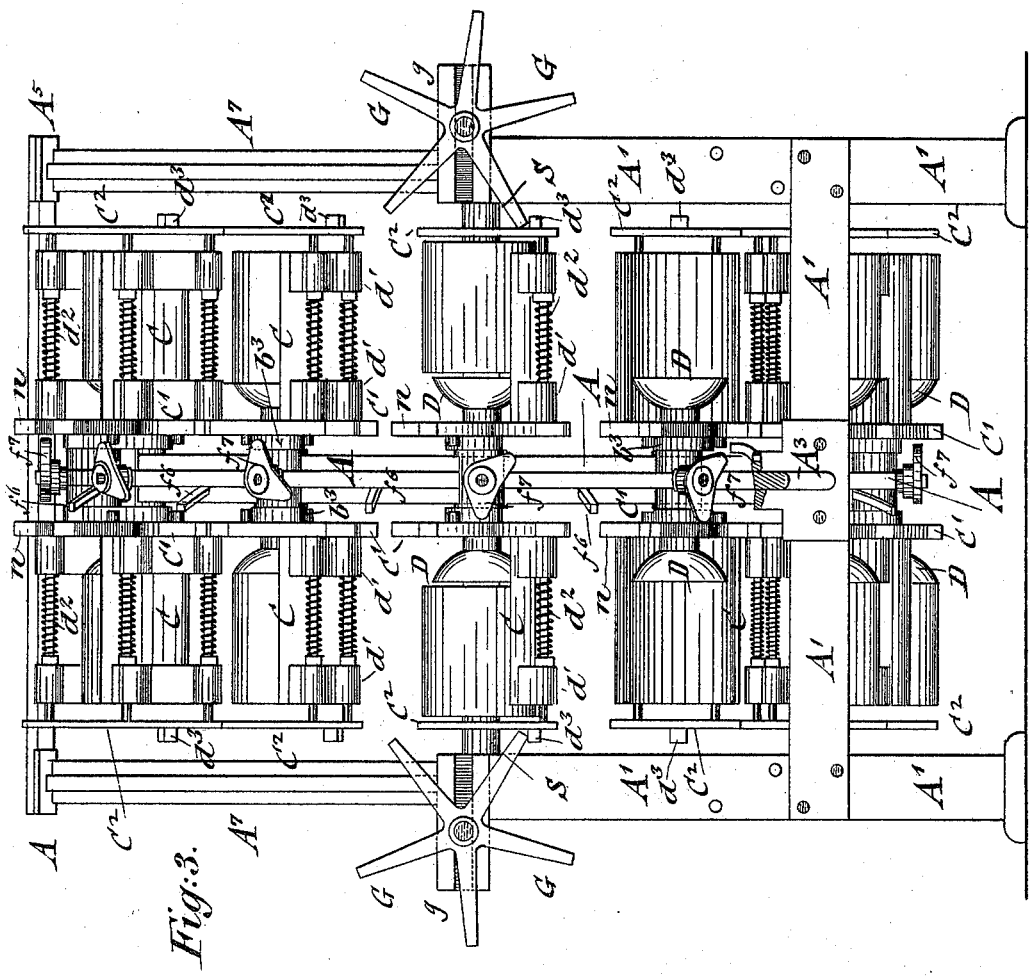
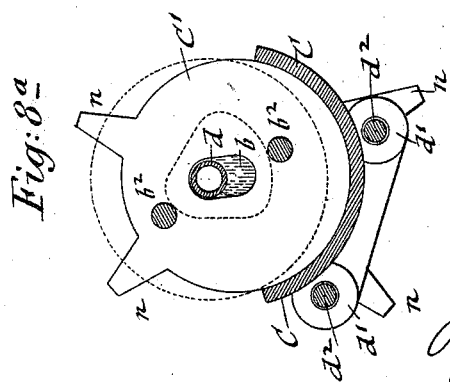
WITNESSES: INVENTOR

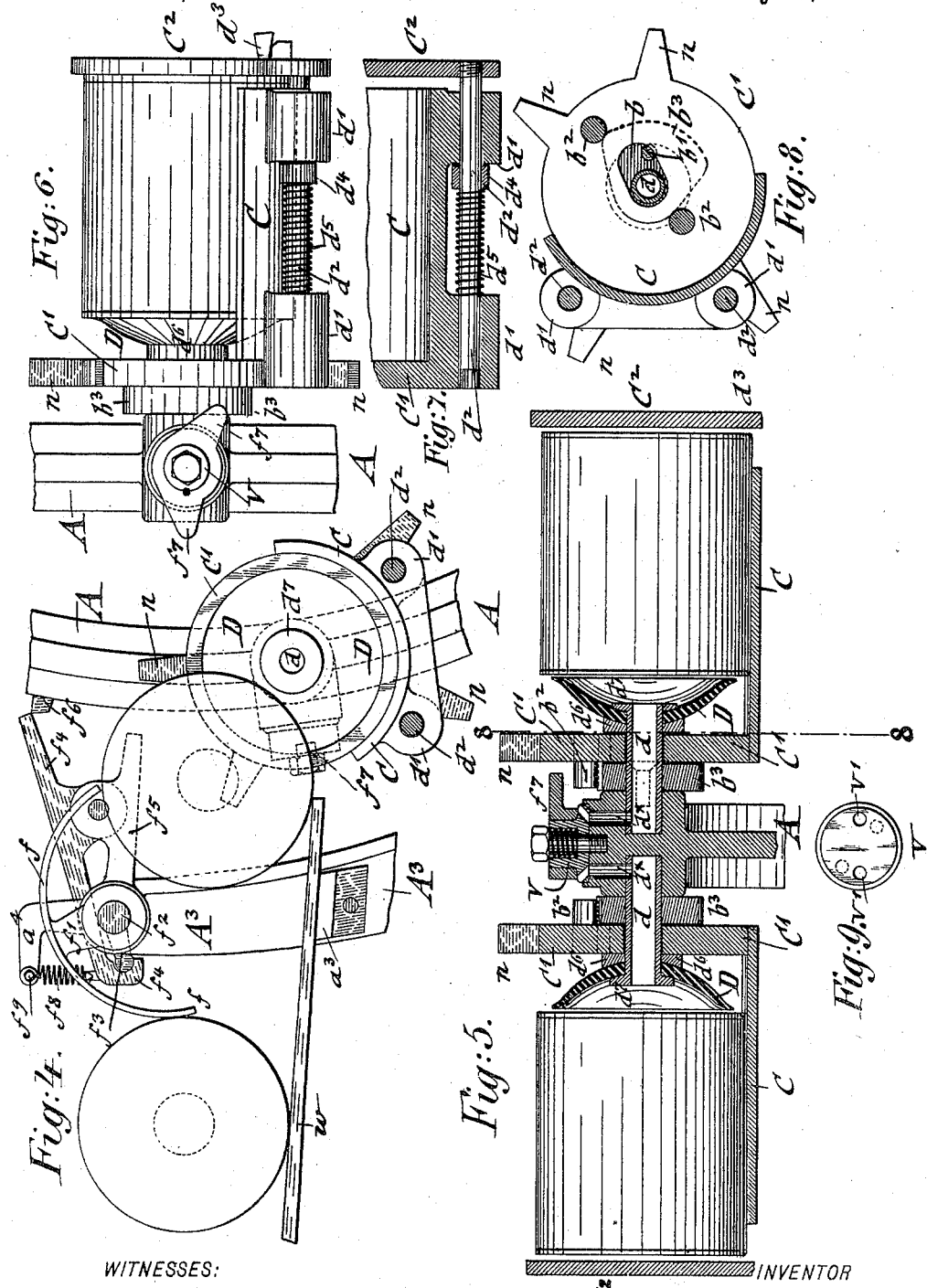

UNITED STATES PATENT OFFICE.

BENNET J. MALMFELT, OF NEW YORK, N. Y., ASSIGNOR, BY MESNE ASSIGNMENTS, TO THE AUTOMATIC CAN MACHINERY COMPANY, OF WESTFIELD, NEW JERSEY.

MACHINE FOR TESTING SHEET-METAL CANS.

SPECIFICATION forming part of Letters Patent No. 586,072, dated July 6, 1897.

Application filed August 25, 1894. Renewed November 17, 1896. Serial No. 612,525. (No model.)

*To all whom it may concern:*

Be it known that I, BENNET J. MALMFELT, a citizen of the United States, residing in the city, county, and State of New York, have invented certain new and useful Improvements in Machines for Testing Sheet-Metal Cans, of which the following is a specification.

This invention has reference to an improved machine for testing sheet-metal cans in a quick and effective manner, the testing being accomplished by pneumatic means and the operations of feeding the cans to the machine and separating the leaky cans from the tight cans being accomplished in an automatical manner by the action of the machine without requiring any special manipulation by the attendant; and the invention consists of a machine for testing sheet-metal cans, in which a ring-shaped supporting-frame is arranged to which rotary motion is imparted, said ring-shaped frame being provided at its outer circumference with equidistantly-arranged lugs and at both sides of said frame with arc-shaped holders for the cans, said lugs actuating successively an oscillating can-feeding device by which the cans are fed over inclined ways to the holders. The holders are provided at each end with a head, of which the outer head is spring-cushioned, while the inner head is adapted to turn on a hollow spindle attached to the ring-shaped supporting-frame. The spindle is provided near the axially-movable head with an elastic bell-shaped suction-head, against which the top of the can is pressed by the opposite spring-cushioned head, actuated by one of the radial arms of a star-shaped frame that is supported in bearings of an upright standard of the machine. The hollow spindle to which the elastic suction-head is applied is connected by a channel with a valve, said valve being provided with a lug that is actuated by a fixed arm on the can-feeding mechanism, so as to close the valve as soon as the can is pressed against the suction-head, so that the same is retained thereon by suction even when the opposite head as the holder is released from the actuating-arm of the star-shaped frame. The head of each holder adjacent to the elastic suction-head is provided with projecting lugs, so that the holder can be turned on its axis as the lugs of the head are engaged by antifriction-rollers arranged on a stationary arm at the upper part of the machine and again as they come in contact with antifriction-rollers arranged on a stationary arm at the lower part or delivery end of the machine. The bad or leaky cans are dropped from the holders before the same arrive at the delivery end of the machine, while the tight or good cans are delivered onto an inclined chute at the delivery end as soon as the valve of the suction-head is opened by the contact of its lug with a stationary stop at the delivery end of the machine, so that air is admitted to the inside of the can and the latter permitted to drop off from the suction-head and pass over the chute to a suitable conveyer.

The invention consists, further, of certain details in the construction of the can-feeding mechanism; also, in the means for shifting the holders away from the cans, so that the cans are supported by the suction-heads only, as will be fully described hereinafter, and finally pointed out in the claims.

Figure 2:
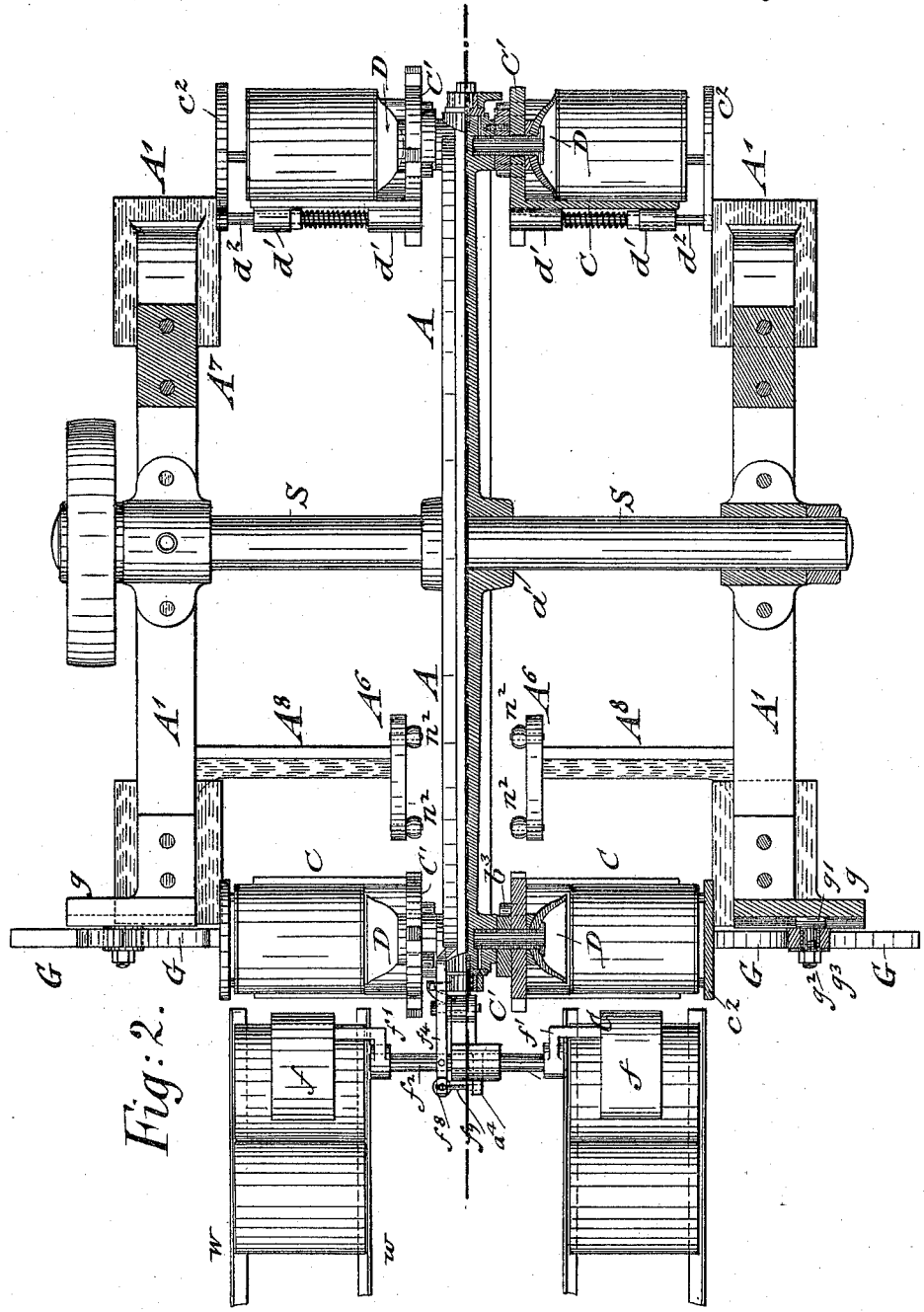

In the accompanying drawings, Figure 1 represents a side elevation of my improved machine for testing sheet-metal cans. Fig. 2 shows the machine partly in sectional plan view and partly in horizontal section on line 2 2, Fig. 1. Fig. 3 is an end elevation of the machine, in which the can-feeding mechanism is removed. Fig. 4 is a side view of the can-feeding mechanism with the outer head of the can-holder removed, drawn on a larger scale. Fig. 5 is a vertical transverse section through a pair of holders, suction-heads, and the air-valve of the latter. Figs. 6 and 7 are respectively a detail side elevation of one of the can-holders and a vertical section of the same. Figs. 8 and $8^a$ are vertical transverse sections through the can-holder on line 8 8, Fig. 5; and Fig. 9 is a detail bottom view of the air-valve for the suction-heads, shown in detached position.

Similar letters of reference indicate corresponding parts.

My improved machine for testing sheet-metal cans is arranged as a double machine—that is to say, at each side of a central rotary ring-shaped supporting-frame are arranged an equal number of equidistant can-holders and suction-heads and all the necessary accessories for testing the cans, which accessories are located symmetrically at each side of the central rotary frame. As both machines are operated simultaneously, it is only necessary to describe one of the machines, as the other half is the exact counterpart of the first and is actuated simultaneously therewith.

Referring to the drawings, A represents the ring-shaped supporting-frame, the cross-section of which is preferably made in the shape of a cross. The frame A is connected by radial arms $a$ $a$ with a central hub $a'$, that is keyed to a horizontal driving-shaft S, which turns in suitable bearings that are attached on yoke-shaped supporting-standards A'. The driving-shaft S receives motion by a suitable belt and pulley or other transmitting mechanism, the motion being so timed that the different successive operations can be performed in a reliable manner. The side standards A' are connected at their lower ends by transverse brace-pieces $A^2$, which are firmly bolted to said standards. The front brace $A^2$ carries at its middle portion an upwardly-extending arm $A^3$, as shown in Figs. 1 and 2, on which the can-feeding mechanism F is supported. The rear brace $A^2$ supports a curved chute $A^4$, on which the bad or leaky cans are dropped and conducted off. To bracket-arms $a^3$, attached to each side of the upwardly-extending arm $A^3$, are attached inclined ways $w$, over which the cans to be tested are conducted to the feeding mechanism, which is arranged approximately upon a level with the driving-shaft S at the front or ingoing end of the machine.

The can-feeding mechanism F consists of an arc-shaped plate $f$, of sheet metal, which is applied to an arm $f'$, that is pivoted to the upper end of the arm $A^3$, the pivot $f^2$ being connected by a lug $f^3$ with the recessed rear end of an oscillating arm $f^4$, that is fulcrumed to a stationary inwardly-extending bracket-arm $f^5$ of the arm $A^3$. The recessed rear end of the oscillating arm $f^4$ is acted upon by a helical spring $f^8$, which is attached to said rear end and to a lateral pin $f^9$ on a stationary arm $a^4$, that is located at the upper end of the arm $A^3$, as shown in Figs. 2 and 4. The spring $f^8$ tends to hold the arm $f^4$ and plate $f$ in the normal position (shown in Fig. 1) and to return the arm $A^4$ and plate $f$ after each oscillation of the same. The rotary ring-shaped frame A is provided at one side of its outer circumference with laterally-bent lugs $f^6$, which project into the path of the oscillating arm $f^4$, so as to engage the same. The lugs $f^6$ are arranged equidistantly from each other on the frame A, as many lugs being arranged as can-holders are arranged on the machine. As one lug $f^6$ after the other engages the oscillating arm $f^4$ the same is raised into the position shown in Fig. 4, so that the recessed front end of the arm $f^4$ engages the lug $f^3$ on the spindle $f^2$ and moves thereby the arc-shaped plate $f$ in backward direction, so as to release the can that is in position next to the ring-shaped supporting-frame and permit it to move over the inclined ways $w$ into the can-holder which is then located next to the inner ends of the ways $w$. While the can is thus permitted to pass onto the holder, the next following can is retained by the plate $f$, as shown in Fig. 4, and prevented from moving downward on the inclined ways until the retaining-plate $f$ is returned into its initial or normal position, in which position it retains the can, which in the meantime has rolled down on the inclined ways, as shown in Fig. 1. The stationary bracket-arm $f^5$, which is located below the oscillating arm $f^4$, is bent sidewise, as shown in Fig. 2, and serves to engage the lugs $f^7$ on the spindles of a number of air-valves V, which are arranged equidistantly from each other on the outer circumference of the ring-shaped supporting-frame A, so as to close said valves as they pass successively past the stationary bracket-arm $f^5$.

At each side of the ring-shaped supporting-frame A are arranged a number of equidistant can-holders C, which are formed of arc-shaped plates and inner heads C', which latter are applied loosely by central openings to hollow spindles $d$, that are firmly secured into the supporting-frame A at right angles thereto. The inner ends of the spindles $d$ communicate with radial channels $d^\times$, arranged in the outer circumference of the ring-shaped frame A, as shown in Fig. 5, with the air-valves V, which are provided with openings V', one for the spindle at one side and the other for the spindle at the other side of the frame A. When the air-valves V are formed in one direction or the other, the outlet-openings of said channel are either closed or opened.

On the under side of the arc-shaped holders C are arranged sockets $d'$, into which are inserted guide-rods $d^2$, that extend beyond the opposite end of each holder C and support a second outer head $C^2$, which is provided at its outer side, near its lower part, with a central projecting lug $d^3$, as shown clearly in Figs. 1 and 3. Between the inner sockets $d'$ on the holders and collars $d^4$ on the guide-rods $d^2$ are interposed helical springs $d^5$, (shown in Figs. 6 and 7,) which serve to cushion the outer heads $C^2$ and to return the same into their normal position relatively to the inner heads C'. The spindle $d$ is extended through the inner head C' of each can-holder C to such an extent that a bell-shaped suction-head D, of soft rubber or elastic material, can be mounted thereon. The suction-head D has an opening at its center through which the spindle $d$ passes, the central portion of the suction-head D resting on a concaved collar $d^6$ and the suction-head when the weight of the can overcomes the suction—in other words, when a sufficient quantity of air is admitted into the can, so that the partial vacuum in the suction-head is destroyed, in which case the can is dropped from the suction-head onto the holder and from the latter onto the conducting-plate $A^4$. Below the can-feeding mechanism F is arranged a can-delivery chute H, and above the same, on the arm $A^3$, an inwardly-projecting lug $a^×$, Fig. 1, which is in the path of the lug $d^7$ of the air-valves $v$, and which serves to open the valve of each holder as the same passes the lug $f^6$. As soon as the air-valve is opened the air is admitted instantly through the valve, channel, and hollow spindle into the suction-head, so that the vacuum in the same is destroyed and the can permitted to drop instantly from the suction-head and pass off over the inclined chute H. As the head $C'$ of each holder C approaches the first roller $n^2$ of the arm $A^6$ the lug $n$ on the head $C'$ which is then in the path of the first roller $n^2$ is engaged by the latter, so as to turn the holder back again for an angle of about ninety degrees. This brings the last lug $n$ of the head $C'$ of each holder into the path of the second roller $n^2$ of the arm $A^6$, which completes thereby the axial turning of each can-holder and returns it into its initial position relatively to the can-feeding mechanism, so that another untested can can be fed over the ways $w$ to the can-holder.

The dropping off of the leaky cans from the suction-heads D and holders C is facilitated by a shifting action which is imparted to the head of each holder C as the same passes below the antifriction-rollers $n'$ and $n^2$ of the arms $A^5$ and $A^6$. For imparting this shifting motion to the head $C'$ each head is provided with a slot $b$, which extends from the center of the head $C'$ in a direction opposite to the holder C, as shown in Figs. 8 and $8^a$. To the ring-shaped supporting-frame A is attached, by a fastening-screw $b'$, a cam $b^3$, which is interposed between the frame A and each head C and provided with an opening for the passage of the hollow spindle $d$, as shown in Fig. 5. The cam $b^3$ is engaged by two pins $b^2$, which are attached to each head $C'$, one at each side of the cam, as shown in Figs. 5, 8, and $8^a$. One pin $b^2$ is nearer to the center of the head $C'$ than the other, so that when the head is turned on its axis by the action of the rollers $n'$ or $n^2$ on the lugs $n$ of the head the latter and thereby the holder C are shifted on its spindle $d$ first into the position shown in Fig. $8^a$ and then back again into the position shown in Fig. 8.

The first shifting motion of the head $C'$ and holder C is accomplished during the turning of the holder by the action of the rollers $n'$, so that the holder is moved away from the can and the latter retained on the suction-head D entirely by the action of the partial vacuum in the same. As the holder C is by the turning motion of the rollers $n'$ placed below the cam, though at a distance from the same equal to the length of the slot $b$, a leaky can which is dropped by the suction-head would drop on the holder and be supported thereon until the holder is gradually brought by the rotary motion of the frame A into inverted position, as shown at the lower right-hand portion of Fig. 1, so that the can is dropped from the same by gravity on the conducting-plate $A^4$. The tight cans are retained on the suction-heads and move on with the same until the vacuum is destroyed by the opening of the valves V of the suction-heads, which opening takes place when the lugs $f^7$ are engaged by the lug $a^×$ on the arm $A^3$. The tight cans are then immediately released by the suction-heads and dropped in the delivery-chute H. The head $C'$ of each holder C is turned immediately before the opening of the valves by the lug $a^×$ by the first roller $n^2$ of the lower arm $A^8$, and again turned by the second roller $n^2$ after the can is delivered, so that by these two turning motions the head $C'$ is shifted back into its normal position concentric to its spindle and also the holder placed in position to receive another untested can. The testing operation hereinbefore described is then repeated, each holder receiving, as it passes the feeding mechanism, a new untested can, which is transferred to the suction-head by the action of the arms of the rotating spider-frame G, the closing of the air-valve $v$, and the return of the head $C^2$ into its former position, while the turning of the can-holders is produced by the upper and lower rollers $n'$ $n^2$, as before described, by which the holders are successively turned, so as to move the cans away from the holders and return the holders into their initial position into line with the feeding mechanism, so as to receive another untested can, and so on.

By the operation of the machine the testing of the cans is automatically performed, the bad or leaky cans being dropped off from the can-holders as the latter are gradually turned into inverted position at the lower part of the machine, while the good cans are carried over into line with the delivery-chute and dropped on the same when the air-valve is opened and the vacuum in the suction-head destroyed. In this manner the leaky cans are separated in a reliable manner by pneumatic action from the good and tight cans, they being then resoldered at the untight parts and returned to the testing-machine, while the good cans are ready for use.

Having thus described my invention, I claim as new and desire to secure by Letters Patent—

1. The combination of a rotary ring-shaped frame, hollow spindles supported by said frame, elastic bell-shaped suction-heads on said spindles, having yielding rim portions projecting beyond the spindles, said rim portions being unsupported at the back, can-being firmly retained thereon by a nipple $d^7$ on the end of the spindle $d$, as shown clearly in Fig. 5, while the rim portion of the same projects at some distance beyond the spindle and is unsupported at its back, so that it can freely yield to pressure. Each suction-head D is made thicker at its center and gradually tapering toward its circumference, so that when the can is pressed against the suction-head D the air between the head of the can and the suction-head is compelled to pass through the hollow spindle $d$, channel $d^\times$, and outlet-opening V' of the air-valve $v$ to the atmosphere, when the air-valve is then quickly closed and the pressure on the can released. The can is supported by the suction-head owing to the suction exerted by the partial vacuum in the suction-head on the head of the can.

Sidewise of the can-feeding mechanism F of the machine is arranged on each side standard A' a fixed rail $g$, in the dovetailed groove of which is adjusted a dovetail block $g'$, that carries a spindle $g^2$, on which is frictionally supported a spider-frame G, having five or more radial arms. The spider-frame G is frictionally supported on the spindle $g^2$ by a suitable screw-nut $g^3$ and intermediate washer, so as to turn axially on the spindle, but without moving too freely thereon. The spider-frame G serves to actuate the outer spring-cushioned heads $C^2$ of the can-holder C, so as to press the cans against the suction-heads D. For this purpose the lugs $d^3$ of the outer heads $C^2$ engage successively the ends of the arms of the spider-frame G, as shown in Figs. 3 and 6, and carry thereby the spider-frame along, so that it turns on its axis until its arm is released by the lug $d^3$. By the pressure of the arm of the spider-frame G on the head $C^2$ the latter is moved against the tension of its cushioning toward the ring-shaped supporting-frame A, so that the can is firmly pressed against the edge of the elastic bell-shaped suction-head D, so that the latter is pressed toward the inner head C', whereby the air in the suction-head is forced through the hollow spindle and air-valve to the outside, the valve being open during the lateral motion which is imparted to the can. By the forward motion of the supporting-frame A the lug $f^7$ of the air-valve $v$ strikes against the bent inner end of the stationary bracket-arm $f^5$ and produces thereby the closing of the air-valve $v$, so that the can is retained on the suction-head when the head $C^2$ is released from the pressure of the arm of the spider-frame G, whereby the head $C^2$ is returned by the action of its springs to its former or normal position. As the head $C^2$ is returned by its springs the bottom of the can is released by the same and the same supported by the holder C and suction-head D, the latter holding the can tightly owing to the suction exerted on the head of the same. As the supporting-frame A moves on the next holder is placed in line with the inclined ways $w$ of the can-feeding mechanism, so that by the action of the lugs $f^6$ on the oscillating arm $f^4$ the next can is transferred to the holder, which can is pressed by the action of the next arm of the spider-frame G on the outer head $C^2$ in lateral direction toward the suction-head D of the holder and then retained on the same by the closing of the air-valve of the same owing to the contact of its lug $f^7$ with the stationary bracket-arm $f^5$. In this manner each holder on the ring-shaped supporting-frame is successively supplied with a can and the can supported by pneumatic action on the suction-heads, so that it can be thoroughly tested as to its tightness as the can is carried around by the rotary supporting-frame until it arrives at the outgoing or delivery end of the machine.

In the machine shown in the drawings twelve holders are arranged at each side of the ring-shaped supporting-frame A, so that at each full rotation of the machine twenty-four cans are supplied to the holders and tested as to their tightness; but it is obvious that any other number of holders may be arranged on the supporting-frame, so that a greater or smaller number of cans may be tested at each rotation of the supporting-frame A.

The inner head C' of each holder C is provided with four outwardly-extending lugs $n\, n$, which lugs serve to turn the holder on its axis as they are successively placed in contact with antifriction-rollers $n'\, n'$ and $n^2\, n^2$, that are located at the ends of stationary arms $A^5$ and $A^6$, arranged respectively at the upper and lower parts of the machine. The upper arm $A^5$ of the rollers $n'\, n'$ is supported on an upright standard $A^7$, attached to each side standard A', said arm $A^5$ being concentric, or nearly so, to the ring-shaped frame A, the rollers $n'$ being arranged in the same vertical plane with the inner heads C' of the can-holders C. The lower arm $A^6$ is supported on a lateral arm $A^8$, attached to the lower front part of the side standards A'. When the head C' of one holder arrives in front of the first antifriction-roller $n'$ of the arm $A^5$, one of its lugs $n$ forms contact with the same and turns thereby the holder through an angle of about ninety degrees, more or less. The second antifriction-roller $n'$ forms contact with the next lug $n$ of the head C' and turns the can-holder for another angle of about ninety degrees. The two axially-turning motions which are thus imparted by the upper rollers $n'$ to each can-holder serve to bring the holder C into a position below the can, so as to form a support for the cans and at the same time compensate for the turning action of the ring-shaped supporting-frame A. As the holders move on with the supporting-frame they are gradually brought into inverted position, as shown at the lower right-hand side of Fig. 1, so that any can which is dropped thereon from the suction-heads is conducted by gravity to a curved plate $A^4$. (Shown in Fig. 1.) Any bad or leaky can drops off from holders supported loosely on the spindles, and mechanism for successively feeding the cans to be tested to said holders, substantially as set forth.

2. The combination of a rotary ring-shaped frame, hollow spindles supported by said frame, valves for said spindles, can-holders supported loosely on said spindles, elastic suction-heads of bell shape attached to the spindles at their centers and having freely-yielding rim portions projecting beyond the spindles, said rim portions being unsupported at the back, mechanism for successively feeding the cans to be tested to said spindles, means for pressing the cans against the suction-heads, means for closing said valves so as to retain the cans on the suction-heads by the partial vacuum in the same, and means for opening the valves, substantially as set forth.

3. The combination of a rotary ring-shaped frame, hollow spindles on said frame, elastic suction-heads attached to one end of said spindles, valves connected with the opposite ends of the spindles, can-holders placed loosely on said spindles, mechanism for successively feeding the cans to be tested onto said holders, mechanism for pressing the can against its suction-head, means for closing the valves of the spindles so as to retain the cans on the suction-heads, means for turning the can-holders on their axes so as to compensate for the rotary motion of the frame, and means for opening the valves of the spindles so as to drop the tight cans from their suction-heads, substantially as set forth.

4. The combination of a rotary ring-shaped frame, having projecting lugs on its circumference, can-holders supported equidistantly thereon, inclined ways for guiding the cans to the holders, an arc-shaped retaining-plate, and a lever connected with the retaining-plate, said plate being intermittently actuated by the lugs for oscillating the retaining-plate and feeding one can after the other to the holders, substantially as set forth.

5. The combination of a rotary ring-shaped frame, can-holders supported by the same, inclined ways for feeding the cans to be tested, an oscillating retaining-plate, a fulcrumed and spring-actuated lever engaging a lug on said plate, and lugs on the rotary frame adapted to intermittently engage the fulcrumed lever and oscillate the retaining-plate, so as to deliver one can to each holder while retaining the next following can, substantially as set forth.

6. The combination of a rotary ring-shaped supporting-frame, hollow spindles supported by said frame, at right angles thereto, valves communicating with the inner ends of said spindles, can-holders placed loosely on said spindles, elastic suction-heads attached to the outer ends of the spindles inside of the heads of the can-holders, a sliding and spring-actuated head supported by and guided on the bottom of each of the can-holders, means for engaging said sliding head and pressing it toward the suction-head, and a stationary arm located in the path of the valve-lugs, so as to close the same as soon as the can has been moved up against the suction-head by the movable head, substantially as set forth.

7. The combination of a rotary ring-shaped frame, can-holders supported on said frame at right angles thereto, movable heads provided with outwardly-projecting lugs and arranged at the outer end of the can-holders, said heads being guided by spring-actuated rods in sleeves of the can-holders, a star-shaped frame pivoted to stationary supports at right angles to the movable heads, the arms of said star-shaped frame being adapted to engage said lugs so as to move the spring-actuated head of each can-holder toward the opposite head of the same, as the can-holders pass one after the other over the star-shaped frame, substantially as set forth.

8. The combination of a rotary ring-shaped frame, can-holders supported at right angles to the same and provided with sleeves at their under sides, movable heads for the outer ends of said can-holders, said heads being provided with spring-cushioned rods guided in sleeves of the can-holders, and means for engaging the movable heads so as to press them against the tension of their cushioning-springs toward the inner head of each can-holder, substantially as set forth.

9. The combination with a rotary ring-shaped frame, of can-holders attached at right angles to said frame around the circumference of the same, movable heads guided by spring-cushioned rods in sleeves of each can-holder, said movable heads being each provided with a projection at its outer side, a star-shaped frame supported at right angles to said movable heads and adapted to swing around a central pivot, and means for adjusting the said star-shaped frame toward the movable heads, substantially as set forth.

10. In a can-testing machine, the combination of a rotary ring-shaped frame, can-holders supported on said frame at right angles thereto, guided spring-cushioned heads at the outer ends of said can-holders, a star-shaped frame applied to a stationary horizontal piece on the supporting-frame, and means for adjusting the center pivot of said star-shaped frame on the horizontal guide-piece, so as to permit its adjustment relatively to the movable heads, substantially as set forth.

11. The combination of a rotary ring-shaped supporting-frame, can-holders supported at right angles on the same, said can-holders being provided with an inner disk, having lugs extending from the same, arms located respectively at the upper and lower part of the frame, provided with an antifriction-roller at each end, said antifriction-rollers being arranged to engage the projecting lugs of the heads of the can-holders, so as to turn the can-holders on their axes and return them into their initial position, substantially as set forth.

12. The combination of a rotary ring-shaped frame, hollow spindles supported on said frame, can-holders mounted loosely on said spindles, valves connected with the inner ends of said spindles, suction-heads on the outer ends of the same, means for intermittently turning the can-holders on the spindles in one direction back into their initial position, a spring-cushioned head guided on each can-holder, means for moving the spring-cushioned heads toward the suction-heads of the can-holders, means for closing the valves of each can-holder as soon as the can is pressed by the movable head toward the suction-head, means for shifting each can-holder on the spindle, so as to clear the holder and support the can by the suction of the suction-head, and means for opening the air-valves of the suction-heads so as to drop the tested cans, substantially as set forth.

13. The combination of a rotary ring-shaped frame, spindles applied to said frame, can-holders supported loosely on said spindles, the heads of said can-holders being provided with a radial center slot, pins located at opposite sides but at different distances from the center of the head of the can-holder, stationary cams located on the spindle adjacent to the heads of the can-holders, and means by which the can-holders are intermittently turned on their axes first in one then in return direction and simultaneously shifted on their spindles so that the head of the can-holder is placed eccentrically to said spindle, substantially as set forth.

14. The combination of a rotary ring-shaped frame, spindles supported by said frame at right angles thereto, can-holders provided with inner heads, which are loosely mounted on said spindles, lugs extending from the outer circumference of said heads, suction-heads applied to said spindles adjacent to the heads of the same, for supporting the cans by suction, stationary friction-rollers supported in the path of the lugs of the heads of the can-holders, so as to intermittently turn the same first in one, then in return direction, and means for shifting the can-holders on the spindles, first into position eccentrically thereto and then back into their normal position thereon while the intermittent turning of each can-holder takes place, substantially as set forth.

In testimony that I claim the foregoing as my invention I have signed my name in presence of two subscribing witnesses.

BENNET J. MALMFELT.

Witnesses:
PAUL GOEPEL,
K. R. BRENNAN.